(12) United States Patent
Balakoff et al.

(10) Patent No.: US 9,138,979 B2
(45) Date of Patent: Sep. 22, 2015

(54) LOW PEEL FORCE SURFACE PROTECTION FILM AND METHOD OF USING SAME

(71) Applicant: Tredegar Film Products Corporation, Richmond, VA (US)

(72) Inventors: Gary M. Balakoff, Midlothian, VA (US); Bankim D. Desai, Chesterfield, VA (US); Shailesh C. Patel, Chesterfield, VA (US)

(73) Assignee: Tredegar Film Products Corporation, Richmond, VA (US)

( * ) Notice: Subject to any disclaimer, the term of this patent is extended or adjusted under 35 U.S.C. 154(b) by 0 days.

(21) Appl. No.: 13/875,880

(22) Filed: May 2, 2013

(65) Prior Publication Data

US 2013/0295312 A1   Nov. 7, 2013

Related U.S. Application Data

(60) Provisional application No. 61/641,453, filed on May 2, 2012.

(51) Int. Cl.
*B32B 38/10* (2006.01)
*C09J 7/02* (2006.01)
*B32B 27/32* (2006.01)

(52) U.S. Cl.
CPC ............... *B32B 38/10* (2013.01); *B32B 27/32* (2013.01); *B32B 27/327* (2013.01); *C09J 7/0225* (2013.01); *C09J 7/0296* (2013.01); *B32B 2250/24* (2013.01); *B32B 2307/748* (2013.01); *C09J 2203/31* (2013.01); *C09J 2423/006* (2013.01); *C09J 2423/04* (2013.01); *C09J 2423/16* (2013.01); *Y10T 428/1452* (2015.01); *Y10T 428/24355* (2015.01)

(58) Field of Classification Search
CPC ............................... B32B 38/10; C09J 7/0225
USPC ................... 428/41.3, 141; 156/247, 325
See application file for complete search history.

(56) References Cited

U.S. PATENT DOCUMENTS

2007/0020471 A1   1/2007   Pip et al.

FOREIGN PATENT DOCUMENTS

| WO | WO 2009/158036 A2 | 12/2009 |
| WO | WO 2009158036 A2 * | 12/2009 |
| WO | WO 2011/096350 A1 | 8/2011 |

* cited by examiner

*Primary Examiner* — Daniel Lee
(74) *Attorney, Agent, or Firm* — Condo Roccia Koptiw LLP

(57) ABSTRACT

A method of protecting a smooth surfaced substrate by a surface protection film that has improved high temperature peel force properties and low residue upon removal of the surface protection film from the smooth surfaced substrate.

16 Claims, 1 Drawing Sheet

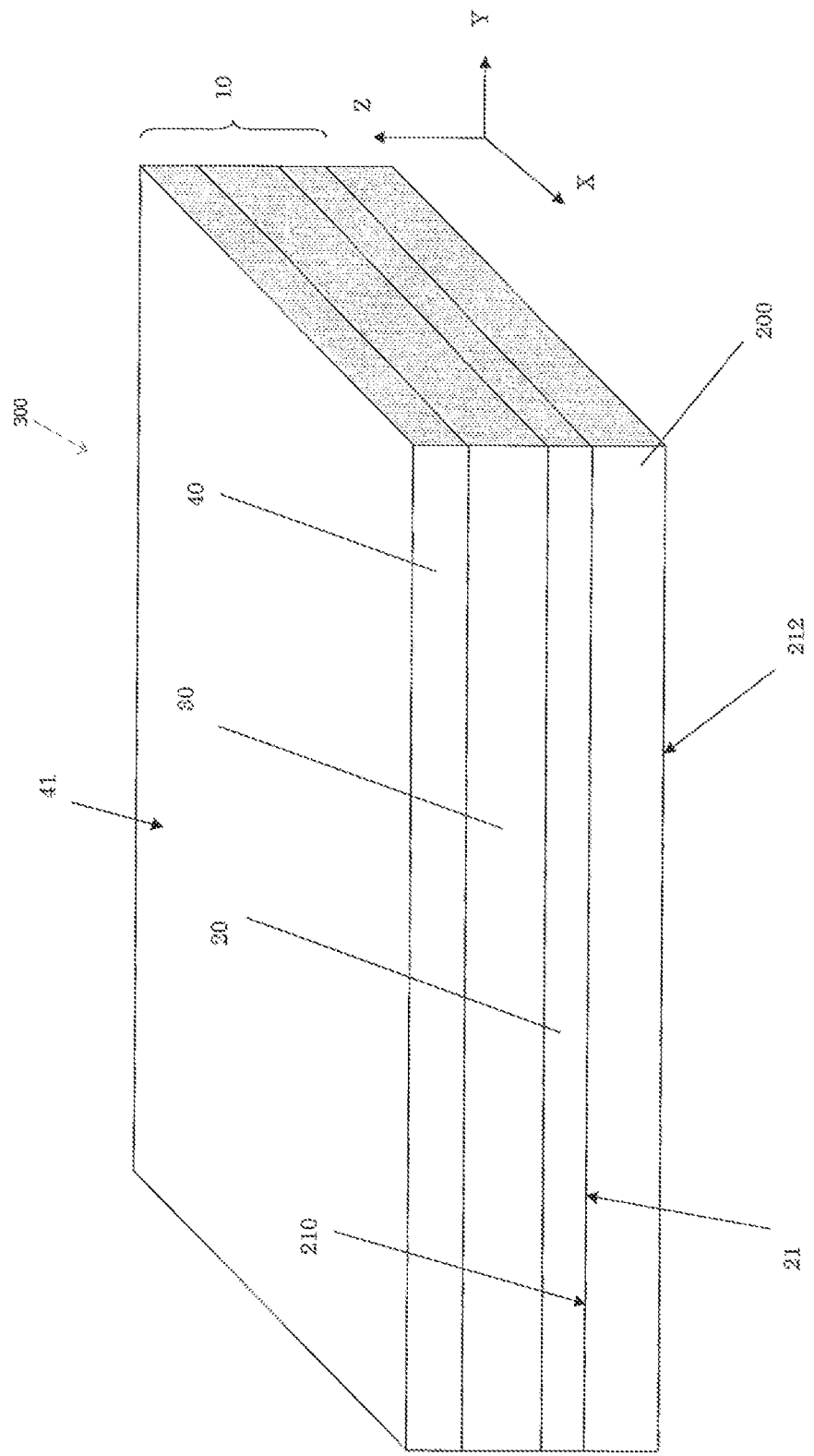

LOW PEEL FORCE SURFACE PROTECTION FILM AND METHOD OF USING SAME

BACKGROUND

The disclosure relates to a method of using surface protection films to adhere to and protection of smooth surfaced substrates.

Surface protection films, also known as masking films, are typically used to provide a physical barrier to prevent damage, contamination, scratching, scuffing, or other marring of a substrate to which they are adhered. Surface protection films may be used to provide such protection during manufacture, shipping, or storing prior to use of the substrate. Substrates used as optical components for televisions, computer monitors and other displays require surface protection films that are adhered to the surface of the substrate and then subsequently removed from the surface of the substrate without damaging the substrate or leaving residue, staining or other defects on the surface of the substrate. Substrates used as optical components by their nature require surfaces that are smooth, having a roughness of less than 0.0127 micron.

The manufacture and use of smooth surface substrates requires that the smooth surface substrates undergo a sequence of operations, such as cutting, coating, edge polishing, stacking, and shipping. The surfaces of the smooth surface substrate need to be protected during these operations, as well as during storage. Moreover, several of these processes, particularly the cutting and edge grinding operations, can increase the temperature of the substrate. As the temperature of the substrate increases, there is an increased risk that the surface protection film will adhere too strongly (peel force is more than 100 g/25 mm per the high temperature 70 deg. C. test method discussed herein) to the smooth surface substrate. In such cases, there is an increased risk that the surface protection film will tear or delaminate when it is removed, or will leave a residue on the smooth surface substrate or will stain the smooth surface substrate, all of which are detrimental. An example of a smooth surfaced substrate is Polymethylmethacrylate ("PMMA") substrates used as a light guide plate in the back light assembly for LCD/LED panel manufacturing.

A balance in the surface protection film's performance properties is needed for a method of adhering a surface protection film to a smooth surface substrate to ensure that the surface protection film remains adhered to the smooth surface substrate surface during processing, yet the surface protection film does not adhere too strongly (peel force is more than 100 g/25 mm at 23 deg. C. and 70 deg. C.) to the smooth surface substrate such that the surface protection film leaves residue or other defects on the surface of the smooth surface substrate.

Also an issue is when known surface protection films containing pressure-sensitive adhesive layers adhere to the surface protection film itself when the surface protection film is wound on a roll or the adhesion layer otherwise contacts a portion of the surface protection film. This phenomenon, known as "blocking" can result in processing difficulties and can also result in the film tearing or delaminating as it is unwound, resulting in poor yields. In some instances, a release paper can be used to prevent blocking, but this adds to the cost, increases waste, and adds complexity to the manufacturing and use of the surface protection films. As such, there exists the need to have method of adhering a surface protection film to a smooth surface substrate wherein there is not a need to remove a release paper while providing a surface protection film that does not have issues with blocking.

SUMMARY OF THE DISCLOSURE

The present application relates to a method comprising adhering a film to a surface of a substrate to form a protected substrate, said film comprising at least an adhesion layer and a release layer, said adhesion layer being in contiguous contact with the surface of the substrate, the adhesion layer consisting essentially of 30 wt % to 42 wt %, by weight of the adhesive layer, of a propylene-based, random, elastomeric co-polymer having at least 75 wt % to 92 wt %, by weight, of the co-polymer of propylene; and 58 wt % to 70 wt %, by weight of the adhesive layer, of one or more polyethylene polymers; and removing the film from the protected substrate. The present application further relates to a protected substrate comprising a substrate comprising an upper surface and a lower surface and thickness there between and a film, the film an adhesion layer and a release layer, the adhesion layer comprises a contact surface the contact surface in contiguous contact with the upper surface, the upper surface having a roughness of 0 micron to 0.0127 micron, the adhesive layer consisting essentially of 30 wt % to 42 wt %, by weight of the adhesive layer, of a propylene-based, random, elastomeric co-polymer having at least 75 wt % to 92 wt %, by weight of the co-polymer, of propylene; and 58 wt % to 70 wt %, by weight of the adhesive layer, of one or more polyethylene polymers.

BRIEF DESCRIPTION OF THE DRAWING

FIG. 1 is a perspective view of a protected substrate.

DETAILED DESCRIPTION

The present application relates to a method comprising adhering a surface protection film to a smooth surface substrate to form a protected substrate and removing the surface protection film from the protected substrate. Optional steps for the present method includes adhering a second surface protection film to a second surface of the smooth surface substrate; exposing the protected substrate to a temperature equal to or greater than 70 deg. C.; cutting the protected substrate; coating the protected substrate; edge polishing the protected substrate; stacking the protected substrate; shipping the protected substrate; removing the second surface protection film from the protected substrate and combinations of these steps.

The method may include the step of exposing the protected substrate to a temperature equal to or greater than 70 deg. C. It has been found that when a protected substrate is exposed to temperatures of 70 deg. C. and higher (although less than or equal to the softening or melting point of the smooth surface substrate, such as a softening temperature of 150 deg. C. for PMMA), the peel force required to remove the surface protection film from the smooth surface substrate is above the desired range of 10 g/25 mm and 100 g/25 mm and that increase in residue result. As such, there is a need to prevent the residue resulting from the adhesive layer when it is anticipated that the protected substrate will be exposed to elevated temperatures (70 deg. C. or greater).

The method may include the step of cutting the protected substrate. Often application of the surface protection film is to a larger piece of smooth surface substrate than what will ultimately be used in as the optical component in a television, computer monitor or other display. The protected substrate (the smooth surface substrate with the surface protection film adhered) is then cut to the desired dimensions for the optical component and then the surface protection film is removed. The cutting creates elevated temperatures and abrasion sites where the surface protection film may lift from the smooth surface substrate prematurely or create sections that adhere too strongly to the smooth surface substrate.

The method may include a step of edge polishing of the protected substrate. This step may be after a cutting step or may be independent of a cutting step. The edge polishing step precedes the removal of the surface protection film removal.

The balance achieved in the present method between the adhering properties and the removal properties of the surface protection film from the smooth surface substrate is derived from the selection of the adhesive layer.

With reference being made to FIG. 1, illustrated therein is a film 10 shown adhered to a substrate 200, together forming a protected substrate 300. The substrate may comprise polymethylmethacrylate, an acrylic polymer, referred to herein as "PMMA". Smooth surface substrates are used in a variety of applications. Prisms and high clarity sheets made of smooth surfaced substrates such as PMMA are useful in light guiding plates, and in other optical applications.

The substrate 200 is shown as a generally planar member having an upper surface 210 and a lower surface 212 and thickness there between. The substrates are typically 1 mm to 8 mm thick (as measured in the z-axis direction). Other shapes of substrates are known in the art, and may have more than two surfaces, and, for example, can be triangular shaped in cross-section (z-y or z-x plane). Protecting one or more surface of the substrate 200, such as during manufacture or processing of the substrate 200, or during transportation or storage, is a primary use of the surface protection films disclosed herein.

In the embodiment shown in FIG. 1 for the protected substrate 300, the surface protection film 10 comprises three distinct layers. In this embodiment, the film 10 has an adhesion layer 20, a core layer 30 and a release layer 40. While three-layer films are preferred, two-layer films 10 may also be used such that the core layer 30 is optionally not present in the two-layer films.

A film may be dimensionally described as having a machine direction (also referred to as the x-axis direction), a cross direction (also referred to as the y-axis direction), and a thickness (z-axis direction). The machine or x-axis direction is defined by the direction in which the film passes through the manufacturing process. Typically, films are produced as long sheets or webs which have a much longer length (machine direction) than width (cross direction).

The adhesion layer 20 is capable of adhering to the upper surface 210 or lower surface 212 of a substrate 200 by van der Waals forces resulting in a peel force at room temperature (23 deg. C.) of greater than 10 g/25 mm but less than 100 g/25 mm, preferably between 10 g/25 mm and 60 g/25 mm. In addition, peel force after the protected substrate 300 is exposed to a high temperature (70 deg. C.) should be between 10 g/25 mm and 100 g/25 mm, preferably between 10 g/25 mm and 80 g/25 mm. The desired peel force properties from the removal of the adhesion layer 20 from the protected substrate 300 provide the right balance of adhesion during the cutting and polishing and handling of the protected substrates 300, but also provide for the surface protection film 10 to be removed from the protected substrate 300 at the upper surface 210 and/or lower surface 212 of the substrate 200 without causing damage to either the film 10 or the upper surface 210 and/or lower surface 212 of the substrate 200 and without leaving a residue or contamination on the substrate upper surface 210 and/or lower surface 212.

The adhesion layer 20 has a contact surface 21 that is placed in surface-to-surface contact with a surface of the substrate 200 is that is to be protected, such as the upper surface 210 and/or lower surface 212. In general, it is desired that the contact surface 21 and upper surface 210 and/or lower surface 212 be in contiguous contact to achieve the desired range of peel force between the film 10 and the substrate 200 when the film is removed. The contact surface 21 of adhesion layer 20 should have a surface roughness ($R_a$) of from 0 micron to 1.524 micron, or more preferably, between 0 micron and 0.762 micron.

The adhesion layer 20 comprises a portion of the surface protection film thickness. In an embodiment, the surface protection film comprises an adhesion layer 20 and one other layer, the adhesive layer 20 may comprise 10 vol % to 20 vol % of the film 10 volume, such as 15 vol % of the film 10. In another embodiment, the surface protection film comprises an adhesive layer 20 and at least two other layers, the adhesive layer 20 may comprise 10 vol % to 20 vol % of the film 10. The adhesion layer 20 consists essentially of a blend of one or more propylene-based, random, elastomeric co-polymer, optionally one or more low density polyethylene polymer and/or a high density polyethylene. The selection of the materials and composition for the adhesion layer affects the peel force (discussed below) on a substrate.

The term "propylene-based" means that the polymer has sufficient crystalline propylene to give rise to a detectable heat of fusion. These polymers are differentiated from other olefinic elastomeric polymers in which the heat of fusion is attributed to crystalline ethylene derived polymer units.

The propylene-based, random, elastomeric co-polymer are random copolymers of propylene and monomers of ethylene, 1-butene, 1-hexene and 1-octene made using a metallocene catalyst and mixtures thereof, which differentiates these elastomeric co-polymers from block copolymers in which constituent parts of the same polymer chains are separately and sequentially polymerized. The propylene-based, random, elastomeric co-polymer exhibits isotactic polypropylene crystallinity (i.e., greater than 80% mm triad by 13C NMR; 250-350 mg in deuterated tetrachloroethane at 120 deg. C.; full proton decoupling with 90° pulse angle and at least 15 sec. delay). When three adjacent monomers are of the same configuration, the stereoregularity of the triad is "mm". If two adjacent monomers in a three-monomer sequence have the same chirality and that is different from the relative configuration of the third unit, the triad has "mr" tacticity. A triad having a middle monomer with an opposite configuration from the ends of the triad have an "rr" triad. See WO 00/01745; Polymer, Vol. 30 (1989) pg. 1350; Macromolecules, Vol. 17 (1984) pg. 1950. The present propylene-based random elastomeric co-polymer has greater than 80% of mm triads.

Preferably the propylene-based, random, elastomeric co-polymer contains isotactic propylene segments separated by one or more units from a co-monomer. The one or more propylene-based, random, elastomeric co-polymers comprise between 75 wt % to 92 wt % propylene, based upon the weight of the co-polymer and 10 wt % to 25 wt % of co-monomer, based upon the weight of the co-polymer.

In embodiments herein, the propylene-based, random, elastomeric co-polymers are polypropylene copolymers with a co-monomer of ethylene, 1-butene, 1-hexene and 1-octene made using a metallocene catalyst. In one embodiment, the polypropylene-ethylene random elastomeric copolymer comprises an ethylene content from about 8 wt % to about 25 wt % (75 wt % to 92 wt % of polypropylene); about 9 wt % to about 20 wt % (80 wt % to 91 wt % of polypropylene); about 9 wt % to about 18 wt % (82 wt % to 91 wt % of polypropylene); by weight of the polypropylene-ethylene random elastomeric copolymer. Particularly preferred polypropylene-ethylene random elastomeric copolymers are the Vistamaxx™ elastomers available from ExxonMobil. Suitable examples include: Vistamaxx™ 6102 (ethylene content of 16 wt %), Vistamaxx™ 6202 (ethylene content of 15 wt %), Vistamaxx™ 3980FL (ethylene content of 9 wt %), Vistamaxx™ 3020FL (ethylene content of 11 wt %), and Vistamaxx™ 3000 (ethylene content of 11 wt %).

The one or more propylene-based, random, elastomeric co-polymer makes up 30 wt % to 42 wt % of the adhesion layer preferably 35 wt % to 40 wt % of the adhesion layer.

The adhesion layer also optionally has one or more polyethylene polymers, such as one or more low density polyethylene polymers and/or one or more high density polyethylene polymers such that there is a total of one or both of the low density polyethylene polymers and one or more high density polyethylene comprising 58 wt % to 70 wt % of the adhesion layer.

The low density polyethylene has a density of 0.910 g/cm$^3$ to 0.940 g/cm$^3$ and most preferably between 0.920 g/cm$^3$ and 0.930 g/cm$^3$. The low density polyethylene polymer constitutes between 28 wt % and 70 wt %, such as 40 wt % and 70 wt %, such as 58 wt % and 70 wt % of the adhesion layer and preferably constitutes 60 wt % to 65 wt % of the adhesion layer. The term "low density polyethylene" as used herein, includes linear low density polyethylene polymers.

The high density polyethylene has a density of between about 0.940 g/cm$^3$ and 0.970 g/cm$^3$. One embodiment is a high density polyethylene with a density of 0.960 g/cm$^3$ and a melt index of 18.0. The high density polyethylene constitutes between 0 wt % and 30 wt % of the adhesion layer.

The adhesion layer should be essentially free of tackifiers and also essentially free of vinyl acetate copolymers, such as ethylene vinyl acetate. As used herein for this purpose "essentially free" means that the adhesion layer contains no more than 1 wt % of a tackifier or vinyl acetate copolymer, such as 0 wt %. Any presence of a measurable wt % of tackifier or vinyl acetate copolymers below 1 wt % will affect the wt % of the adhesion layer components defined previously but all components of the adhesion layer are intended to equal 100 wt % for the adhesion layer.

The surface protection film 10 may optionally have at least one core layer 30. The core layer 30, if present, is located between the adhesion layer 20 and the release layer 40 (z-direction). The optional core layer(s), if present, will comprise between 60 vol % and 80 vol % (of the one or more core layers) of the film 10 volume. The core layer 30 can contain any thermoplastic polymer or polymer blend and may be selected for mechanical properties of the film, such as stiffness, modulus, tear resistance, and similar properties.

In certain embodiments, the optional core layer 30 may comprise a polymer selected from polyethylene, low density polyethylene, linear low density polyethylene, high density polyethylene, medium density polyethylene, polypropylene, random copolymer polypropylene, polypropylene impact copolymers, metallocence-catalyzed polyolefins such as metallocene-catalyzed linear low density polyethylene, plastomers, poly (ethylene-co-vinyl acetate), copolymers of an acrylic acid, poly (ethylene-co-acrylic acid), poly (ethylene-co-methyl acrylate), cyclic olefin polymers, polyamides, poly (ethylene-co-n-butyl acrylate), polyvinyl chloride, nylon, polyester, and combinations thereof. The designation "low density" means the polymer has a density less than about 0.930 g/cm$^3$ and more specifically between 0.910 g/cm$^3$ and about 0.930 g/cm$^3$. The designation "high density" means the polymer has a density of about 0.940 g/cm$^3$ to 0.970 g/cm$^3$.

Suitable polymers for the optional core layer 30 include low density polyethylene, linear low density polyethylene, high density polyethylene, high density polyethylene, polypropylene, random copolymer polypropylene, polypropylene impact copolymers, metallocence-catalyzed polyolefins and mixtures thereof. In one embodiment, a regrind composition is used that includes components present in the adhesive layer and the release layer. The regrind composition may include the components in the other layers and is admixed with the suitable polymers for the option core layer 30.

The release layer 40 provides an outer surface 41 which reduces the tendency of the film 10 to "block" or adhere to itself when stored on a roll. In addition to preventing blocking, the release layer 40 can be formulated to provide a portion of the strength and protective properties to the film 10, if desired.

In one embodiment, the film comprises an adhesion layer 20 and a release layer 40, wherein the release layer 40 is 80 vol % to 90 vol % of the film 10 volume. In another embodiment, the release layer 40 makes up 10 vol % to 20 vol %, of the film 10 volume when the optional core layer(s) 30 are present in addition to the adhesion layer 20.

The release layer 40 may contain one or more olefin polymers or olefin copolymers. For example, polyolefins may also include polymers and copolymers of olefin monomers such as, but not limited to, ethylene, propylene, butene, isobutene, pentene, methyl pentene, hexene, heptene, octene and decene.

Particularly preferred polyolefins used for the release layer 40 include low density polyethylene, linear low density polyethylene and high density polyethylene.

The release properties of the release layer 40 may be created as a function of the composition of the layer. For example, anti-block additives or slip agents may be incorporated into the release layer 40 to decrease blocking. Any presence of a measurable wt % of agents incorporated into the release layer will affect the wt % of the release layer components defined previously but all components of the release layer are intended to equal 100 wt % for the release layer.

Alternatively, the release properties of the release layer 40 may be created by forming a texture on the outer surface 41 of release layer 40, while maintaining an adhesive layer that is capable of being in contiguous contact with a surface of the substrate 200. The texture on the outer surface 41 of the release layer 40 provides an uneven surface of three-dimensional protrusions. See WO 2009/158036 at paragraphs [0021]-[0100].

A variety of fillers or additives may be added to one or more layers of the film 10, but in most embodiments such materials will not be added to the adhesion layer 20. The fillers and additives may be used to provide certain desired characteristics, including, but not limited to, roughness, anti-static, abrasion resistance, printability, writeability, opacity, color, and/or oxidative stability to the film 10. Such fillers and additives are well known in the industry and include, for example, calcium carbonate (abrasion resistance), mica (printability), titanium dioxide (color and opacity) and silicon dioxide (roughness).

The surface protection film 10 can be made in any suitable process known to those skilled in the art. It is most preferable that the films are made in a co-extrusion process using conventional cast or blown film equipment. The use of co-extrusion allows for the relatively simple and easy manufacture of a multi-layered surface protection film composed of distinct layers, each performing specific functions.

The surface protection film 10 may be any desired thickness, but in most embodiments the thickness (as measured in the z-direction) is from 30 micron to 200 micron, such as 30 micron to 100 micron. Removal of the surface protection film as described herein from a protected substrate results an initial room temperature (23 deg. C.) peel force of greater than 10 g/25 mm but less than 100 g/25 mm, as measured using the 180 Degree Peel Test described below. Removal of the surface protection film as described herein from a protected substrate which has been exposed to a temperature of 70 deg. C. and above results a high temperature laminated (described herein below in the 180 Degree Peel Test) peel force of less than 100 g/25 mm, such as between 10 g/25 mm and 100 g/25 mm, such as between 10 g/25 mm and 80 g/25 mm. The high temperature lamination peel force reflects the method steps that create an increase in the temperature to which the protected substrate may be exposed during the manufacturing process discussed herein, such as cutting, polishing or other operations that can increase the substrate temperature or situations where the substrate is at an elevated temperature at the time the film is applied to the substrate.

When the surface protection films are removed from the protected substrate, little or no residue from adhesion layer 20 is left behind is left on the substrate upper surface 210 and/or lower surface 212. Whether there is little or no residue present on the substrate surface upper surface 210 and/or lower surface 212 may be determined by unaided visual inspection of the substrate that is held in front of a flat black background with a light source being present behind or to the side of the viewer to provide enough light for the viewer to inspect the substrate upper surface from approximately 10 to 12 inches (25.4 cm to 30.5 cm).

Test Methods

180 Degree Peel Test

The 180 degree peel test measures the force needed to remove a film from the surface of a substrate when tension is applied to the film parallel to the surface of the substrate to which the film is adhered. Films used in the test are allowed to rest or age for at least 2 hours in a flat (unrolled) condition after manufacture and before testing. In the data presented below, all films were tested two days after manufacture.

The substrates used in the test measure 137.5 mm long× 82.5 mm wide×1-3 mm thick. The polymethylmethacrylate (PMMA) substrates used in the examples were clear PMMA films available at TAP Plastics, Inc. having a surface roughness ($R_a$) of 0.0048 micron.

To prepare the test samples, the film is laid down on a support with the adhesion layer facing up. The substrate is then placed onto the film, taking care to handle the substrate on the edges only. The length of the substrate is aligned with the machine direction of the film (i.e., the direction that the film travels through the manufacturing process). The back of the substrate is then rolled twice in the same direction with a 10-pound rubber covered roller (Cheminstruments Inc., Part Number—HR-CUST/-10#) using only the weight of the roller (i.e., without applying pressure). The film is then cut, leaving a 3.125 mm overhang of film on 3 sides of the substrate and a 50 mm overhang (or "tail") of film on one edge of the substrate, such that the final film dimensions are approximately 6.25 mm wider and approximately 53 mm longer than the substrate dimensions. The substrate with the film is then put in an oven at 65 deg. C. for 2 minutes, immediately rerolled. The substrate with the film adhered is allowed to rest at standard conditions (temperature of 23±2° C. and a relative humidity of 50±5%.) for at least 1, but no more than 2 hours before testing.

The substrate with the film adhered is place into an apparatus that can measure the force needed to peel the film away from the substrate. One such apparatus, and the one used to record the data presented herein, is a TA.XT Texture Analyzer made by Stable Micro Systems, Ltd. and available in the USA from Texture Technologies Corporation. The apparatus was equipped with a 1.0 kg load cell and manual grips with 25 mm×15 mm grip faces.

The 50 mm film tail is wrapped once around a 56.25 mm×18.75 mm×12.5 mm rigid support, such as a thick polymeric sheet, which has been supplied with double-faced tape. The film is wrapped such that the release layer of the film is adhered to the tape. The film is then gently pulled back to expose approximately 50 mm to 75 mm of the substrate. The exposed portion of the substrate is placed in the lower (stationary) jaw of the Texture Analyzer with the substrate against a 56.25 mm×125 mm×12.5 mm rigid support. The film-wrapped support is then clamped in the upper (movable) jaw of the Texture Analyzer, such that the film is partially folded over itself. In this configuration, as the jaws separate from one another, the film will be pulled with a force oriented parallel to the substrate surface and peeled back away from the substrate. The sample should be checked to insure that it is centered and vertically aligned in the clamps. The clamping jaws may need to be offset to insure that as the film is peeled off the substrate, it does not rub against itself. The test is then started under standard environmental conditions noted above. The Texture Analyzer had a gauge length (distance between the upper and lower clamping jaws) of 125 mm, a cross-head speed of 5 mm/sec, a sample rate of 200 pps and was programmed to travel 100 mm, ignoring the first 20 mm and the last 20 mm of travel before measurements are taken.

For the high temperature lamination peel test, the substrate and film are placed into an oven that is pre-heated to 70° C. for 20 minutes. The substrate, with the film applied, is allowed to cool for 24 hours before running the 180 Degree Peel Test described above.

EXAMPLES

A series of films were prepared for testing. The components used to make the films are set forth in Table 1.

TABLE 1

| Component | Designation | Melt Flow Rate (@230 C.) | Melt Index (@190 C.) | Density (g/cm³) |
|---|---|---|---|---|
| Low Density Polyethylene (1) | LDPE-1 | N/A | 5.6 | 0.923 |
| Low Density Polyethylene (2) | LDPE-2 | N/A | 10.0 | 0.923 |
| High Density Polyethylene (3) | HDPE-3 | N/A | 6.0 | 0.957 |
| Polypropylene (4) | PP-5 | 7.0 | N/A | 0.905 |
| Styrene Block Copolymer Elastomer (5) | SBC-6 | 4.5 | N/A | 0.910 |
| Propylene based elastomer (6) | PPE-7 | 20.0 | 9.1 | 0.863 |

Notes
(1) NA217 Equistar Chemicals
(2) NA219 Equistar Chemicals
(3) M6060 Lyondell Basell Industries
(4) R5571 Total Petrochemicals
(5) MD 6741 GO Kraton Polymers
(6) Vistamaxx ®6202 ExxonMobil Chemical Three-layer films (adhesion layer, core layer and release layer) were prepared in a conventional co-extrusion film process on a cast film line using a chilled chrome roll. The films comprise a 12 micron thick adhesion layer, a 56 micron thick core layer and a 12 micron thick release layer (80 micron total thickness for the surface protection film). The films had the compositions set forth in Table 2 below. The films were tested for adhesion strength using the 180 Degree Peel Test mentioned above with PMMA substrates. Results are reported in Table 3.

TABLE 2

| Example No. | Adhesion Layer | Core Layer | Release Layer |
| --- | --- | --- | --- |
| 1 (comparative) | SBC-6 (5%) LDPE-1 (95%) | HDPE-3 (50%) LDPE-1 (25%) PP-5 (25%) | LDPE-1 (80%) HDPE-3 (20%) |
| 2 (comparative) | SBC-6 (15%) LDPE-1 (85%) | HDPE-3 (50%) LDPE-1 (25%) PP-5 (25%) | LDPE-1 (80%) HDPE-3 (20%) |
| 3 (comparative) | PPE-7 (20%) LDPE-2 (80%) | HDPE-3 (50%) LDPE-1 (25%) PP-5 (25%) | LDPE-1 (80%) HDPE-3 (20%) |
| 4 | PPE-7 (35%) LDPE-2 (65%) | HDPE-3 (50%) LDPE-1 (25%) PP-5 (25%) | LDPE-1 (80%) HDPE-3 (20%) |
| 5 | PPE-7 (40%) LDPE-2 (60%) | HDPE-3 (50%) LDPE-1 (25%) PP-5 (25%) | LDPE-1 (80%) HDPE-3 (20%) |
| 6 (comparative) | PPE-7 (45%) LDPE-2 (55%) | HDPE-3 (50%) LDPE-1 (25%) PP-5 (25%) | LDPE-1 (80%) HDPE-3 (20%) |

TABLE 3

| | | Peel force (g/25 mm) | |
| --- | --- | --- | --- |
| Example No. | Substrate | 23° C. (room temp.) | 70° C. (high temp.) |
| 1 (comparative) | PMMA | 5.0 | 5.5 |
| 2 (comparative) | PMMA | 8.4 | 8.5 |
| 3 (comparative) | PMMA | 3.4 | 3.4 |
| 4 | PMMA | 19.3 | 21.4 |
| 5 | PMMA | 31.3 | 42.1 |
| 6 (comparative) | PMMA | 115.0 | 130.0 |

The above data demonstrate the unexpected results obtained when the adhesion layer comprises 30 wt % to 42 wt % of the polypropylene based elastomer and 58 wt % to 70 wt % of low density polyethylene. As indicated by the data, the initial adhesion level at room temperature (23 deg. C.) is below 10 g/25 mm when the propylene based elastomer 20 wt % or less (80 wt % or more of LDPE), and are above 100 g/25 mm when the propylene based elastomer levels are more than 45 wt % (55 wt % of LDPE).

The dimensions and values disclosed herein are not to be understood as being strictly limited to the exact numerical values recited. Instead, unless otherwise specified, each such dimension is intended to mean both the recited value and a functionally equivalent range surrounding that value. For example, a dimension disclosed as "40 vol %" is intended to mean "about 40 vol %"

Every document cited herein, including any cross referenced or related patent or application, is hereby incorporated herein by reference in its entirety unless expressly excluded or otherwise limited. The citation of any document is not an admission that it is prior art with respect to any invention disclosed or claimed herein or that it alone, or in any combination with any other reference or references, teaches, suggests or discloses any such invention. Further, to the extent that any meaning or definition of a term in this document conflicts with any meaning or definition of the same term in a document incorporated by reference, the meaning or definition assigned to that term in this document shall govern.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

The invention claimed is:

1. A method comprising adhering a film to a surface of a substrate to form a protected substrate, said film comprising at least an adhesion layer and a release layer, said adhesion layer being in contiguous contact with the surface of the substrate, the adhesion layer consisting essentially of:
   a) 30 wt % to 42 wt %, by weight of the adhesion layer, of a propylene-based, random, elastomeric co-polymer having at least 75 wt % to 92 wt %, by weight of the co-polymer, of propylene; and
   b) 58 wt % to 70 wt %, by weight of the adhesion layer, of one or more polyethylene polymers; and removing the film from the protected substrate.

2. The method of claim 1 wherein the method further includes adhering a second film to a lower surface of a substrate to form a protected substrate.

3. The method of claim 2 wherein the method further includes removing the second film from the protected substrate.

4. The method of claim 1 where the method comprises one or more optional steps selected from: exposing the protected substrate to a temperature of 70 deg. C. and above; cutting the protected substrate; coating the protected substrate; edge polishing the protected substrate; stacking the protected substrate; shipping the protected substrate and combinations of these steps.

5. The method of claim 1 wherein exposing the protected substrate to a temperature of 70 deg. C. and above takes place before the removing step.

6. The method of claim 5, wherein the film is removed from the protected substrate with a high temperature peel force between 10 g/25 mm and 100 g/25 mm.

7. The method of claim 1, wherein the adhesion layer surface in contiguous contact with the surface of the substrate has a roughness of 0 micron to 1.524 micron.

8. The method of claim 1, wherein at least one surface of the substrate surface comprises a roughness of 0 micron to 0.0127 micron.

9. The method of claim 1, wherein the film is removed from the protected substrate with an initial room temperature peel force of between 10 g/25 mm to 100 g/25 mm.

10. The method of claim 1, wherein the propylene-based, random, elastomeric co-polymers are selected from polypropylene copolymers made using a metallocene catalyst with a co-monomer of ethylene, 1-butene, 1-hexene, 1-octene and mixtures thereof.

11. The method of claim 10, wherein the propylene-based, random, elastomeric co-polymers comprises a polypropylene-ethylene random elastomeric copolymer with an ethylene content from about 8 wt % to about 32 wt % by weight of the copolymer.

12. The method of claim 10, wherein the propylene-based random elastomeric co-polymer comprises greater than 80% of mm triads.

13. The method of claim 1, wherein the one or more polyethylene polymers has a density of 0.920 g/cm$^3$ to 0.930 g/cm$^3$.

14. The method of claim 1, wherein the one or more polyethylene polymers comprises between 28 wt % to 70 wt % of a low density polyethylene and 0 wt % and 30 wt % of a high density polyethylene.

15. The method of claim 1, wherein the adhesion layer contains less than 1 wt % of tackifiers or vinyl acetate copolymers.

16. The method of claim 1, wherein said film further contains a core layer interposed between the adhesion layer and the release layer and wherein the film volume comprises 10 vol % to 20 vol % of the adhesion layer, 60 vol % to 80 vol % of the core layer and 10 vol % to 20 vol % of the release layer.

* * * * *